US 007667874B2

(12) United States Patent
MacDonald et al.

(10) Patent No.: US 7,667,874 B2
(45) Date of Patent: Feb. 23, 2010

(54) METHOD AND SYSTEM FOR IMPROVING PRINT QUALITY (75) Inventors: France M. L. MacDonald, Webster, NY (US); Michael P. Kirby, Pittsford, NY (US); Susan M. Aurand, Fairport, NY (US); Barbara M. Ferguson, Keuka Park, NY (US); Kathleen S. Thomas, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 706 days.

(21) Appl. No.: 11/175,591

(22) Filed: Jul. 6, 2005

(65) Prior Publication Data
US 2007/0008594 A1    Jan. 11, 2007

(51) Int. Cl.
*H04N 1/40* (2006.01)
(52) U.S. Cl. ................................ 358/2.1; 358/468
(58) Field of Classification Search .............. 358/1.9, 358/2.1, 1.15–1.16, 448, 468
See application file for complete search history.

(56) References Cited

U.S. PATENT DOCUMENTS

| | | | |
|---|---|---|---|
| 4,068,266 A | 1/1978 | Liao | 358/425 |
| 4,400,740 A | 8/1983 | Traino et al. | 358/293 |
| 5,204,721 A | 4/1993 | Sharpe | 355/260 |
| 5,257,077 A | 10/1993 | Peters, Jr. et al. | 355/260 |
| 5,363,175 A | 11/1994 | Matysek | 355/208 |
| 5,557,393 A | 9/1996 | Goodman et al. | 355/326 |
| 5,617,214 A | 4/1997 | Webster et al. | 358/296 |
| 5,696,893 A | 12/1997 | Fromherz et al. | 395/112 |
| 5,699,275 A | 12/1997 | Beasley et al. | 709/221 |
| 5,701,557 A | 12/1997 | Webster et al. | 399/77 |
| 5,710,635 A | 1/1998 | Webster et al. | 358/296 |
| 6,102,507 A * | 8/2000 | Yoshida | 347/6 |
| 6,161,218 A | 12/2000 | Taylor | 717/174 |
| 6,463,239 B1 | 10/2002 | Hays et al. | 399/222 |
| 6,480,293 B1 | 11/2002 | Bonikowski et al. | 358/1.15 |
| 6,618,564 B2 | 9/2003 | Lange et al. | 399/54 |
| 6,647,222 B1 | 11/2003 | Digby et al. | 399/81 |
| 6,760,908 B2 | 7/2004 | Ren | 717/173 |
| 6,775,504 B2 | 8/2004 | Godlove et al. | 399/266 |
| 6,814,510 B1 * | 11/2004 | Sabbagh et al. | 400/63 |
| 6,856,411 B1 | 2/2005 | Purvis et al. | 358/1.12 |
| 6,895,191 B2 | 5/2005 | Rommelmann et al. | 399/12 |

OTHER PUBLICATIONS

Hunter Lab Color Scale, Aug. 1-15, 1996, vol. 8, No. 9 (4 pages).

* cited by examiner

*Primary Examiner*—Thomas D Lee
*Assistant Examiner*—Stephen M Brinich
(74) *Attorney, Agent, or Firm*—Alix, Yale & Ristas, LLP (57) ABSTRACT Disclosed herein are methods and systems for improving print quality. In one embodiment, a method of optimizing printer output quality is provided which includes identifying media in at least one media tray, querying a media database for a record corresponding to the identified media, extracting data from a record of identified media, adjusting printer operation based upon the extracted data, and printing on the identified media, wherein the printer operation is adjusted on a page-by-page basis within a single print job. Typical parameters which are adjusted during the print job are the transfer voltages and the volume of toner deposition. In another embodiment, media is assigned to groups based upon its color and print parameters are adjusted as different colors of media are used.

16 Claims, 6 Drawing Sheets

FIG. 1

| | | | | | | | | Media: | XeroxABC | | ▽ | ID: 337 | Version: 4 | Duplicate | New Media | Delete Media | European Xerox Media | Close Form |
|---|---|---|---|---|---|---|---|---|---|---|---|---|---|---|---|---|---|---|

Release: [ ]

Full Media Name

Stock Library Name          XeroxABC                                                Date Added to RML                              Included      Regions
XeroxABC                   Specialty: [ ▽ ]                                         09/27/2002                                    Media         △ European Xerox Media
Grade: European  ▽                     Base Weight: [ 100 ]  Weight (gsm): [ 100 ]  Caliper: [ 110 ] ▽                                          * FX Australian Xerox Media
Color: White ▽ Sides Coated: Uncoated ▽  Coating Type: [ N/A ] ▽  Type: [ Plain ] ▽  Finish: [ Regular ] ▽
Cleanup: Yes ▽ Stock Drill: False ▽    White Point L: [ 94.56 ]  White Point A: [ 2.37 ]  White Point B: [ -9.9 ]

— 108                                                                                      — 110                    — 112

Stock Information  Measurements in: ● inches ○ millimeters

| Stock ID | Stock Library Name | Stock Ext. | Stock Dimension | Width | Height | Reorder No. | Stock Region Owner | Grain | Sequence |
|---|---|---|---|---|---|---|---|---|---|
| △ 210 | XeroxABC | A3+ | 18x12 | 18 | 12 | 00R210 | European Xerox Media | Short ▽ | 0 |
| 312 | XeroxABC | A4 | A4 | 8.27 | 11.69 | 00R312 | European Xerox Media | Long ▽ | 0 |
| 141 | XeroxABC | A3 | A3 | 11.59 | 16.54 | 00R141 | European Xerox Media | Long ▽ | 0 |
| 222 | XeroxABC | SRA3 | SRA3 | 12.6 | 17.72 | 00R222 | European Xerox Media | Short ▽ | 0 |
| 28 | XeroxABC | A4 | A4 | 8.27 | 11.69 | 00R028 | FX Australian Xerox Media | Long ▽ | 0 |
| 37 | XeroxABC | A3 | A3 | 11.69 | 16.54 | 00R037 | FX Australian Xerox Media | Short ▽ | 0 |
| 49 | XeroxABC | SRA3 | SRA3 | 12.6 | 17.72 | 00R049 | FX Australian Xerox Media | Short ▽ | 0 |

Best Practices Information

| Hint ID | Description |
|---|---|
| △ Hint 1 | If Transfer set point adjustments are required for snow defects, refer to the Snow Sample Artifact Procedure in the latest Customer Maintenance Manual Section 3. |
| * | |

Record: |◁ ◁| 1 |▷ ▷|▷* of 1

Subsystem Information

| Subsystem Attribute | Value |
|---|---|
| △ Transfer A Side 1 | 120 |
| Transfer A Side 2 | 120 |
| Transfer B Side 1 | 120 |
| Transfer B Side 2 | 120 |
| Transfer C Side 1 | 0 |
| Transfer C Side 2 | 0 |
| Detack Side 1 | -10 |
| Detack Side 2 | -10 |

METHOD AND SYSTEM FOR IMPROVING PRINT QUALITY

BACKGROUND

The embodiments disclosed herein relate to methods and systems for efficiently producing high quality prints on various types of media.

It is known for a supplier of digital printers to provide customers with a Recommended Media List (RML) in the form of a spreadsheet which itemizes the types of print stock to be used with a particular machine and the print parameters to be used with each type of media. An operator sets up the machine by assigning to each media tray a media name selected from a media selection menu. When the media in a particular tray is changed, the operator selects a new media item from the list.

Techniques are known for tracking media to specific tray locations in a large set of printers. U.S. Pat. No. 6,647,222 discloses a method of operating a printer in which a database is maintained containing description data relating to paper tray contents associated with particular printers. The data for a large number of printers can be searched to locate trays which contain a desired type of media. In some cases, however, attempts to track media to certain locations will backfire when an operator of a printing machine changes the media in a tray without selecting the name of the new media from the media selection menu. Use of media that is not properly identified can result in jamming of the machine and/or blurry prints.

Early versions of RMLs required each parameter to be entered into the media library on each machine. More recently, a supplier of digital printers has been able to provide customers with an updated RML using a software patch. The data can be output in several software formats. This saves machine operators valuable time and minimizes data entry errors that otherwise may occur.

Known RMLs includes about twenty media attributes (properties) for each type of media. The media attributes typically include media characteristics, such as size, grade, color, coating type and weight. Subsystem attributes are not included on conventional RMLs.

In conventional printing of a single print job, the same set of transfer voltages is used for all media types. Typically, the transfer voltages used are an average of the recommended voltages for all of the different media types to be used in the single print job. As a result print quality often is lower when a print job contains several different media types as compared to a job that uses a single type of media. It would be useful to be able to take into account characteristics of the media that affect print quality but are not tied to readily measurable properties of the media.

In conventional color printing, instructions for the deposition of colored toners on a photoconductive belt do not take into account the color of the media. It would be useful to develop a system and method that can improve color quality in print jobs employing several different types of media. It also would be useful to develop a system and method for efficiently obtaining prints with true, identical colors on sheets of media having different degrees of whiteness.

SUMMARY

One embodiment is a method of optimizing printer output quality comprising identifying media in at least one media tray, querying a media database for a record corresponding to the identified media, extracting data from the record of identified media, adjusting printer operation based upon the extracted data, and printing on the identified media, wherein the printer operation can be adjusted on a page-by-page basis within a single print job.

Sometimes, the extracted data includes subsystem attributes, such as transfer voltages. In certain cases, the extracted data includes whiteness data. The extracted data can be used to assign the identified media to a media group. Whiteness data typically is used to modify the volume of toner deposition during development. In some cases, the extracted data can be revised by an operator.

In another embodiment the method further comprises identifying types of print operation adjustments to be made before querying the database, and subsequently querying the database to extract data pertaining to the identified types of print operation adjustments.

A further embodiment is a printer having adjustable quality output, the printer comprising a media tray and a computer. The computer has a database, an input device for the database, and a printer operating system which includes an image quality adjuster. An operator identifies media in the media tray through the input device, and the computer queries the database for records associated with the identified media, extracts data, applies the data to the image quality adjuster of the printer operating system and initiates printing. Often, the image quality adjuster adjusts at least one of transfer voltages and toner deposition volume on a page-by-page basis. Typically, the image quality adjuster adjusts toner deposition based upon media color. In some cases, the extracted data is processed to assign the media to one of several groups. For example, the media can be assigned to a color group.

A further embodiment is a method of operating a printer connected to a user interface, comprising entering, at the user interface, description data relating to at least two different media types located in two different media trays to be used in a single print job, and executing the single print job, wherein the printer automatically adjusts image quality when printing on the different media types. The user interface usually can be accessed on the printer, and frequently can be accessed from a computer terminal remote from the printer.

Yet another embodiment is a printing apparatus comprising printer hardware, at least one media tray, and a control system operative of the printer hardware. The control system includes an attribute configuration subsystem which can adjust print parameters on a page-by-page basis within a single print job. The printing apparatus often includes a media identification database configured to receive data descriptive of the media in the at least one media tray, wherein the control system adjusts print parameters based on media type. In some cases, the media identification database includes data describing at least one of media whiteness and recommended transfer voltages.

BRIEF DESCRIPTION OF THE DRAWINGS

FIG. 2 is a sample of a computer screen showing data in a recommended media list database.

DETAILED DESCRIPTION

A system and a method are described herein for extracting data from a database and using the data to adjust printer parameters on a page-by-page basis as part of a single print job. Furthermore, a method is described for using groups to categorize media whiteness and then adjusting printer parameters as media from different groups is used in order to make prints having accurate color reproductions of original documents or other files.

As used herein, the term "module" refers to both hardware and software components of a system or subsystem. The term "document" is used to denote a document in any state, including (but not limited to) when viewed on a computer display, when formatted as a print file ready for printing, and when in hardcopy form. The state the document is in at any point in the description depends on the context. Also, a "document" may include text, graphics or mixed representations. "Files" are documents or other stored sets of data. A document plus the processing instructions for the document may, for example, constitute a print file. For the purposes of discussion herein, the term "printer" as used herein shall include all different types of printer and output devices, both hard (physical printer) and soft (Web server), or other hardcopy or document rendering apparatus and devices.

As used herein, "whiteness" refers to color which may or may not actually appear white. Clear transparencies can be assigned a whiteness rating, as can colored media. "Transfer voltages" include any voltage applied during the overall transfer process (after development), including pretransfer voltages and detack voltages as well as the voltages tied directly to transfer. "Media attributes" are characteristics or properties of an item, such as a type of media. "Subsystem attributes" are properties specific to a particular type of technology in a module that differ as a function of media type but cannot conveniently be measured directly. Such properties are often determined as a result of trial-and-error type experimentation. Transfer voltages which result in the best quality prints are examples of subsystem attributes. "Adjusting printer operation" refers to adjustments made by a module (including the DFE) to paper handling, image transfer, or image quality based on media attributes or subsystem attributes. Often, these adjustments are made to a single image on a specific piece of media. Adjusting printer operation on a "page-by-page basis" means that printing parameters, including but not necessarily limited to transfer voltages and toner deposition parameters, can vary for different sheets of media that are part of a single print job.

Figure 1:
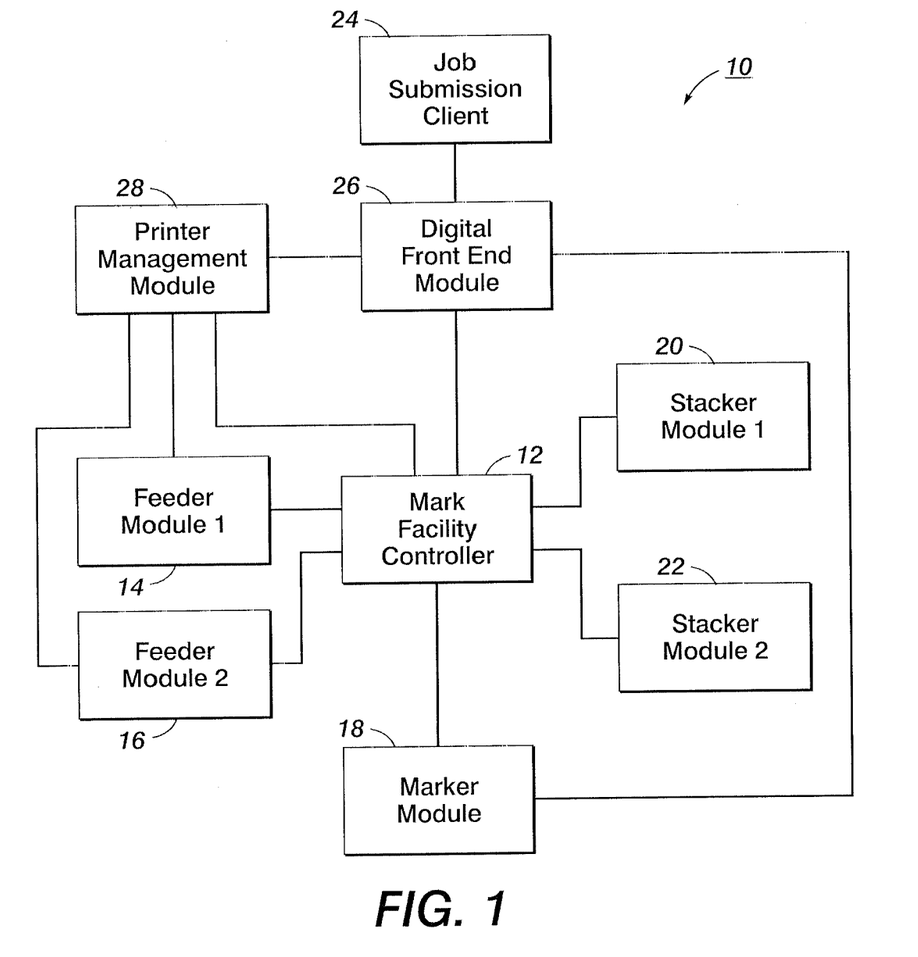
FIG. 1 is a schematic diagram showing the interrelationships between and among various modules of the printer, and between the modules and the client.

Referring now to the drawings and first to FIG. 1, a digital printer control unit is shown and is designated as 10. The digital printer control unit 10 includes a mark facility controller 12 which interacts with a number of machine modules. Feeder module 1, designated as 14 and feeder module 2, designated as 16, feed media to a printer. After a sheet of media is fed, a marker module 18 marks images on the media with toner which is transferred from a photoconductive belt onto the media. After the printed sheets have been heated to set the toner, they are stacked using a stacker module 1, designated as 20, or a stacker module 2, designated as 22.

In order to process a document that is sent to the printer by a client at 24, a raster image processor (RIP) in a digital front-end module 26 decomposes or RIPs a postscript or other page description language (PDL) file into images suitable for imaging on the printer. Typically these are contone images, i.e. byte maps. An important function of a digital front-end (DFE) module 26 is color management, including transforming color pixels from a first representation to a second representation that is suitable for the printer. A DFE is defined herein as an integrated print workflow management system capable of receiving and processing print requests and controlling the operation of a digital marking system (printer) to fulfill the print request. Print requests are defined by 1) a request to print content and 2) processing instructions. The content is typically a page description language (PDL) file or data stream. The processing instructions may be embedded in the content, provided separately, or acquired indirectly by associating a print request with a method of reusing existing processing instructions (queue programming). The processing instructions may be explicit or implicit, describing the desired intent of the resulting printed material. The DFE converts print device independent content and format into print device dependent content that is directly consumable by the digital marking device in fixed time windows. The DFE manages the digital marking system and delivers the print device dependent content. Minimal processing provided by a DFE includes: a PDL or data stream decomposer, an imager or raster input processor (RIP), and an interface for controlling the digital marking system. Additional processing typically provided includes network communication gateways, imposition, local repositories for job storage, and job and printer management controls.

The DFE typically communicates with the mark facility controller 12, which receives a document description from the DFE and performs the scheduling and control of print jobs. Usually, the DFE submits a document assembly tree to the mark facility controller 12. The mark facility controller 12 then manages the print job through completion. Thus, the DFE places an order for a print job and the mark facility controller orchestrates the print job.

In some of the embodiments described herein, processing instructions for the printer include different pretransfer, transfer, and/or detack voltages depending upon the characteristics of the media being used. Within a single print job that uses more than one type of media, the pretransfer, transfer and/or detack voltages, can be adjusted on a page-by-page basis. For example, in the printing of a set of booklet in a single print job, a first set of voltages can be used to print the front and back covers and a second set of voltages can be used to print the interior sheets. The booklets can be stapled as they are completed. This customization based on media type improves print quality and increases efficiency due to the reduction instances of jamming or the simultaneous feeding of multiple sheets. In addition to transfer voltages, other print parameters also can be adjusted on a page-by-page basis.

Customization of voltage settings or other subsystem parameters can be achieved using a print management module 28. The print management module 28 includes a RML which not only contains media properties, but also includes pretransfer, transfer and detack voltages which are intended for use with specific types of media. As used herein, voltages are referred to as "subsystem attributes" because they are not media characteristics but instead are variable which affect print quality, and are often selected based upon trial and error testing.

A screen display 100 for one example of a database of media attributes and subsystem attributes is shown in FIG. 2. Each qualified media type is listed by name in box 102 and stock ID in box 104, with relevant characteristics, such as dimensions, sides coated, weight, etc. also appearing on the display. The lower left corner of the screen display 100 includes a subsystem attribute box 106 listing subsystem attributes that have been entered for the subject media. This screen display is typically seen by the party that updates and maintains the database of recommended media. In the embodiment of FIG. 2, whiteness data such as Lab values are included. Generally stated, the "L" value is shown in box 108, the "a" value is shown in box 110, and the "b" value is shown in box 112. Details regarding the measurement and use of Lab values are provided below.

Figure 3:
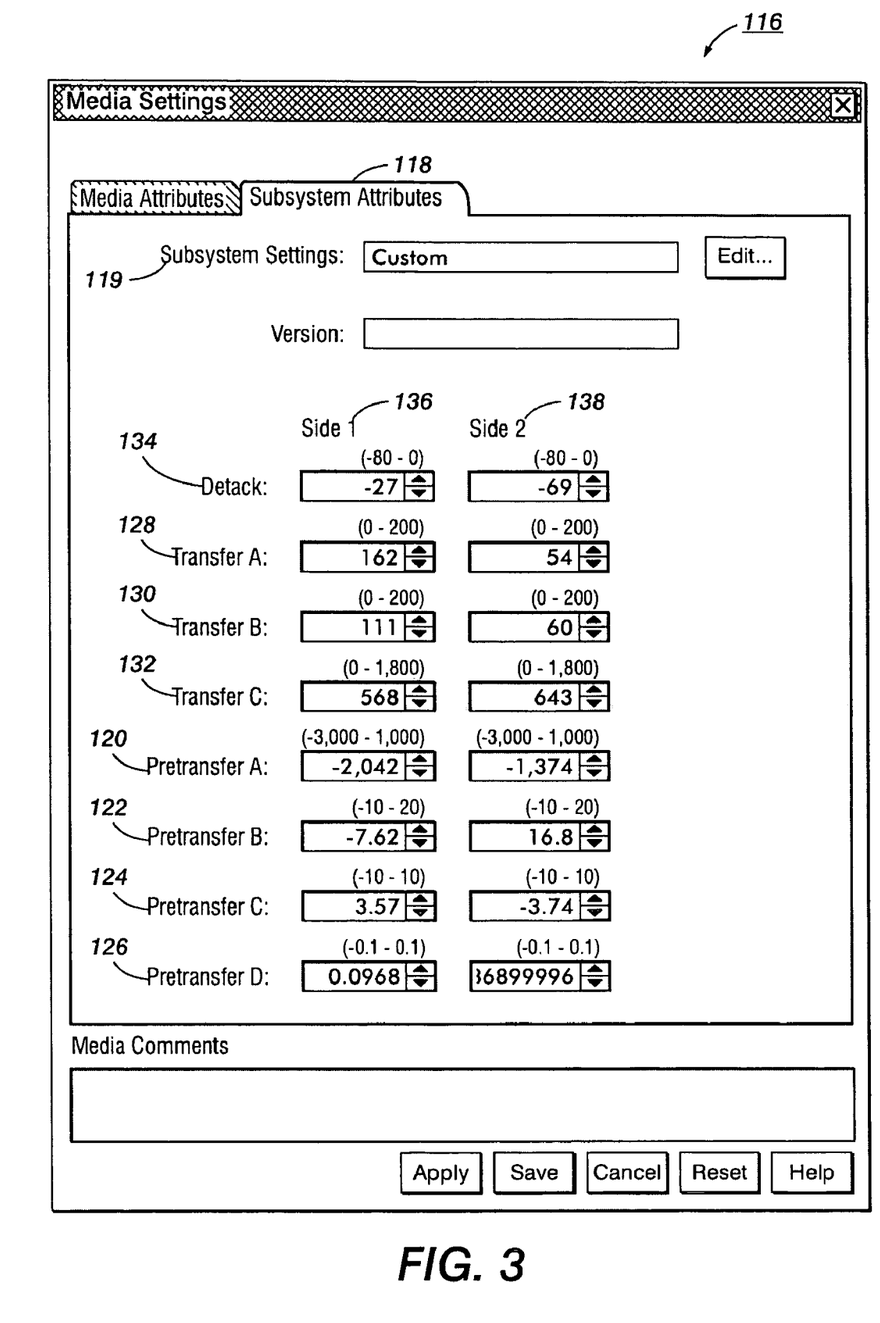
FIG. 3 is a sample of a computer screen showing transfer voltages associated with a particular type of media.

FIG. 3 shows an example of a screen display 116 which either the database provider or the operator of the printer can use to enter new data into the database or revise existing data. This screen appears when the subsystem attributes box 118 is selected for display on the printer itself or on the monitor of a computer that is connected to the printer. Data for pretransfer voltages, transfer voltages, and detack voltages can be reviewed, entered and/or edited. Information regarding the use of pretransfer, transfer and detack voltages is provided in various published documents, including U.S. Pat. No. 6,775,504, the disclosure of which is incorporated herein by reference in its entirety. Pretransfer voltages A, B, C and D at 120, 122, 124 and 126, respectively, treat a developed image on a photoconductive belt prior to transfer. Transfer voltages A, B and C at 128, 130 and 132, respectively, create an electric field to move toner from a photoconductive belt to media. Detack voltages at 134 reverse the electric field induced by the transfer voltages. For 2-sided copying, different voltages typically are used for transfer on the second side. An operator can revise these settings for media which is part of the RML database from a computer connected to the printer. This screen enables custom subsystem settings at 119 to be displayed, entered and/or edited. For example, if media that is not approved is to be used, the operator can use trial and error to derive custom settings that improve the image quality when using this stock. The operator enters and stores these custom settings for the new media in the media database. Subsequent uses of this media will use the optimized settings for the transfer. In the embodiment shown in FIG. 3, voltage settings can be entered for Pretransfer A, Pretransfer B, Pretransfer C, Pretransfer D, Transfer A, Transfer B, Transfer C, and Detack for each of side 1 and side 2 of the media.

Voltages are operator imposed constraints, which, in order to be used, need to be communicated to the marker module. The machine operator can enter voltages manually or using a software patch installed from the printer management software on the printer management module 28. In the embodiment depicted in FIG. 1, software component of the printer management module 28 is supported by a platform known as a PSIP module. The printer management module 28 is an application used by the machine operator to personalize the printer, initiate diagnostics, submit jobs, etc. The printer management module 28 reports the voltages in the same way that it reports the personalizing media attributes of the sheets, such as size, to the appropriate module. The printer management module 28 contains the information about the voltages, which are referred to here as "subsystem attributes" because they refer to system print parameters rather than media characteristics.

Figure 4:
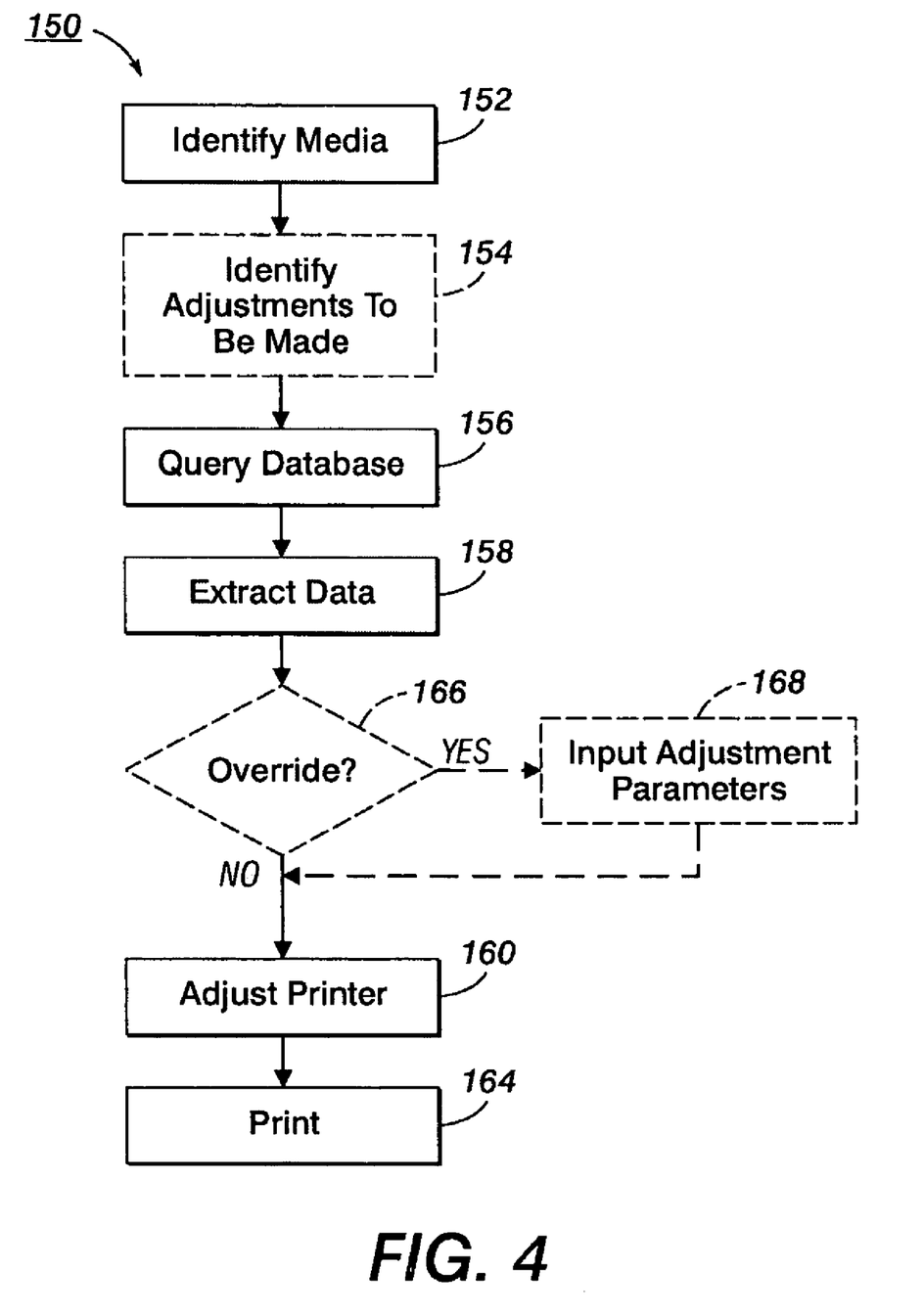
FIG. 4 is a flowchart depicting a method of extracting and using data according to one embodiment.

A flowchart illustrating one embodiment of a method of improving print quality in a printer is shown in FIG. 4. The overall process is designated as 150. First, an operator identifies media at 152 to be used for particular print job. Next, optional adjustments are identified at 154, including an option in which the operator does not want to adjust print parameters on a page-by-page basis. After the media for the job is identified at 152, the attribute specification database is queried at 156 in order to locate records of what parameters, such as voltages, are to be used with the identified media. The relevant data is extracted at 158. The extracted data is used to adjust the printer's parameters at 160 in order to provide for the best quality printing on the identified media at 164. The printer management module 28, shown in FIG. 1, communicates media attributes to the DFE module 26. In order to adjust print parameters on a page-by-page basis, the printer management module 28 communicates media attributes and subsystem attributes to the mark facility controller 12 through the feeder modules 14, 16. When a job is submitted to the DFE module 26, the mark facility controller 12 will add the appropriate media attributes and subsystem attributes to the proposals sent to the feeder modules 14 and 16, marker module 18 and stacker modules 20 and 22. The printer management module 28 enables the instructions such as voltage changes to be varied as media is varied during a single print job. This results in improved print quality when different media types are used in a single print job. As background information, reference can be made to U.S. Pat. Nos. 5,696,893 and 5,617,214, the disclosure of which is incorporated herein by reference in its entirety.

As is shown in FIG. 4, a user optionally can override the use of extracted data at 166 and can input custom data at 168 in order to adjust print parameters. For example, if a user finds that the recommended voltages do not produce images of the expected quality due, for example, to climatic conditions such as excessive humidity in the environment, the user can choose to override the use of the extracted data by entering other data in its place. The printer software then adjusts printing conditions at 160 and printing takes place at 164.

In other embodiments described herein, media is divided into groups based upon a particular characteristic of the media, such as its degree of whiteness. The deposition of colored toner on the photoconductive belt is adjusted in order that the pantone color of the printed image matches the pantone color of the digital file (or another document containing reference colors). When a particular digital color document is printed on several different sheets of media having slightly different degrees of whiteness, the colors will appear to be slightly different on each sheet. Rather than requiring the user of the printer to make adjustments on a trial and error basis at the time of printing, these embodiments use an algorithm to determine which whiteness group a particular type of media should be assigned to, and then the DFE automatically effects an adjustment in the deposition of toner in order to achieve the intended pantone color in the printed image.

In order to develop a digital image, toner is conveyed by an electric field onto a photoconductive belt which has been charged. Details of this process are discussed in various published documents, including U.S. Pat. No. 6,618,564. The toner is given an electric charge, and is placed in an electric field. As a result, the toner moves from its housing onto the charged photoconductive belt. Different voltages excite toners in different amounts. The toner or toners stay on the photoconductive belt until they are transferred to media such as paper. The DFE sends a request to the developer stations to transfer slightly different quantities of toner to the photoconductive belt. More specifically, in one embodiment, the output from the exposure device, e.g. a laser in a raster output scanner (ROS), is adjusted to alter the charging or discharging of the belt, thereby resulting in an increase or decrease in the amount of toner that will be deposited on a particular area of the belt by a developer unit.

According to one method, the whiteness values of each type of white media are measured in a laboratory and are entered in a database which becomes part of the print station software after the database is loaded on a print station computer. At the time of printing, after the user has selected the desired medium for printing, an algorithm is applied to map the media to one of several pre-specified colorimetric groups. The groups are used by the DFE to adjust color values in printing in order that the colors of the printed document match the color of the original digital image. While it is also possible for the group number to be assigned before the data is entered in the database, this embodiment usually would not enable a user to conveniently redefine the groups.

One preferred technique for measuring whiteness is to use the Hunter Lab Color Scale, which is a three dimensional model in which degrees of red and green are shown on a horizontal "a" axis, and degrees of yellow and blue are shown on a horizontal "b" axis that is perpendicular to the "a" axis, and degrees of black and white are shown on a vertical "Y" axis. Measurements are made using a spectrophotometer. Pure white is 100 and pure black is zero. Positive a is red and negative a is green. Positive b is yellow and negative b is blue. Lab values are determined relative to a standard. Each type of media is then mapped to one a several groups based upon its location in Lab space. Each media is then assigned to a group, which determines what types of slight modifications will be made during printing in order to replicate the colors of the original image. In one exemplary embodiment, the media are divided into three different groups, namely Group White, which contains regular white media, Group Bright White, which contains brightened white media, and Group Other, which contains other colors of media, such as red, yellow, orange, green, blue, indigo and violet. In this particular case, the Lab values for the reference media categorized as Group White are an $L_{standard}$ value of 90.5, an $a_{standard}$ value of 2.3 and a $b_{standard}$ value of 1.3. The Lab values for the reference media categorized as Group Bright White are an $L_{standard}$ value of 95.5, an $a_{standard}$ value of 0.1, and a $b_{standard}$ value of 1.2. The values for Group Other are an $L_{standard}$ value of 98.5, an $a_{standard}$ value of 1.2, and a $b_{standard}$ value of 2.2.

Figure 5:
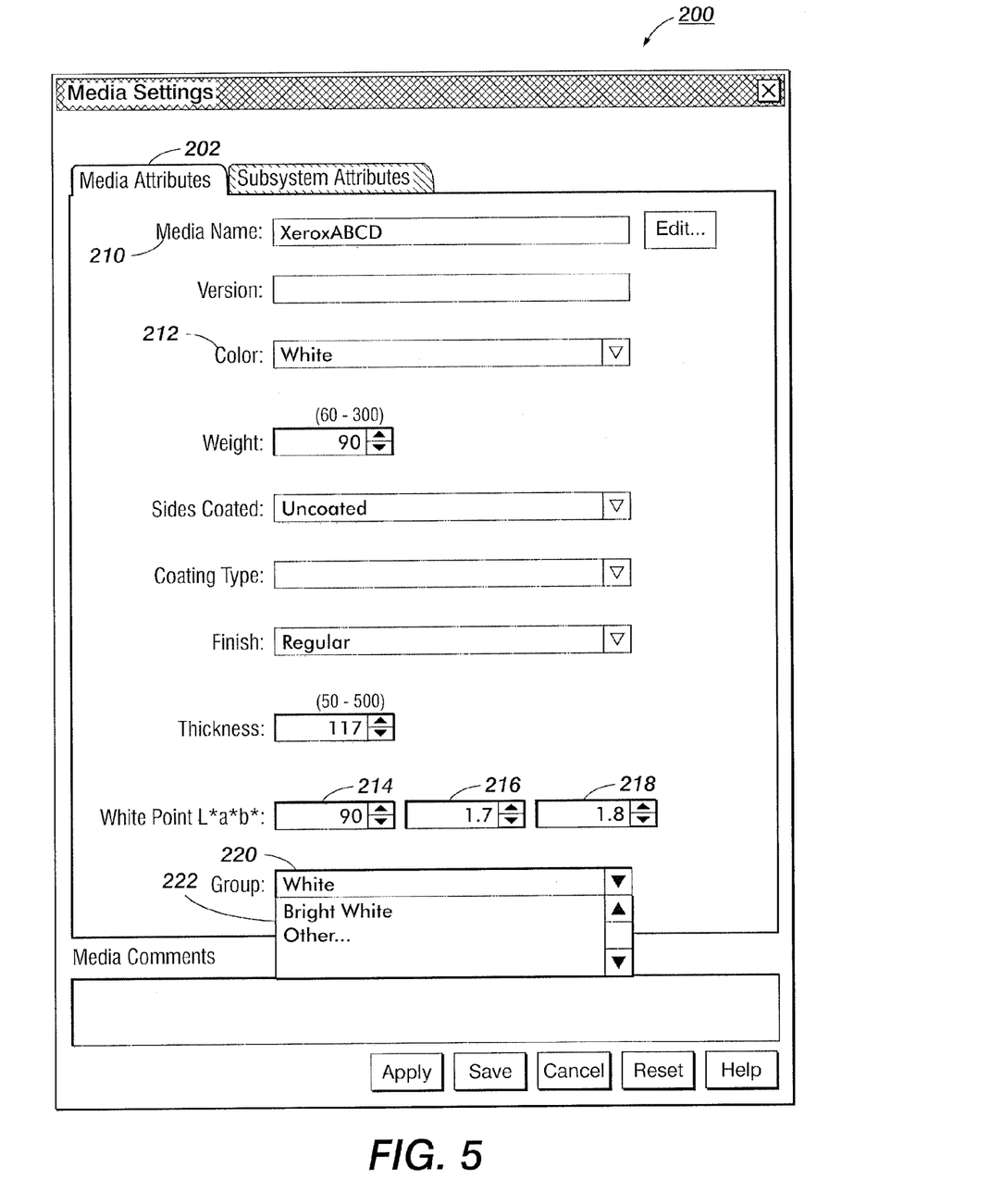
FIG. 5 is a sample of a computer screen showing Lab values associated with a particular type of media.

FIG. 5 shows a computer screen 200 which provides for input of Lab values corresponding to a particular type of media. It is noted that this data also can be input using the computer screen depicted in FIG. 2. As is shown in FIG. 5, a media name 210 is shown and the appropriate color 212 appears in the color box. Based upon Lab values, including L at 214, a at 216 and b at 218, the media type XeroxABCD has been assigned to Group White, as is shown in box 220. Other group choices are Bright White and Other, both of which are shown in box 222.

Figure 6:
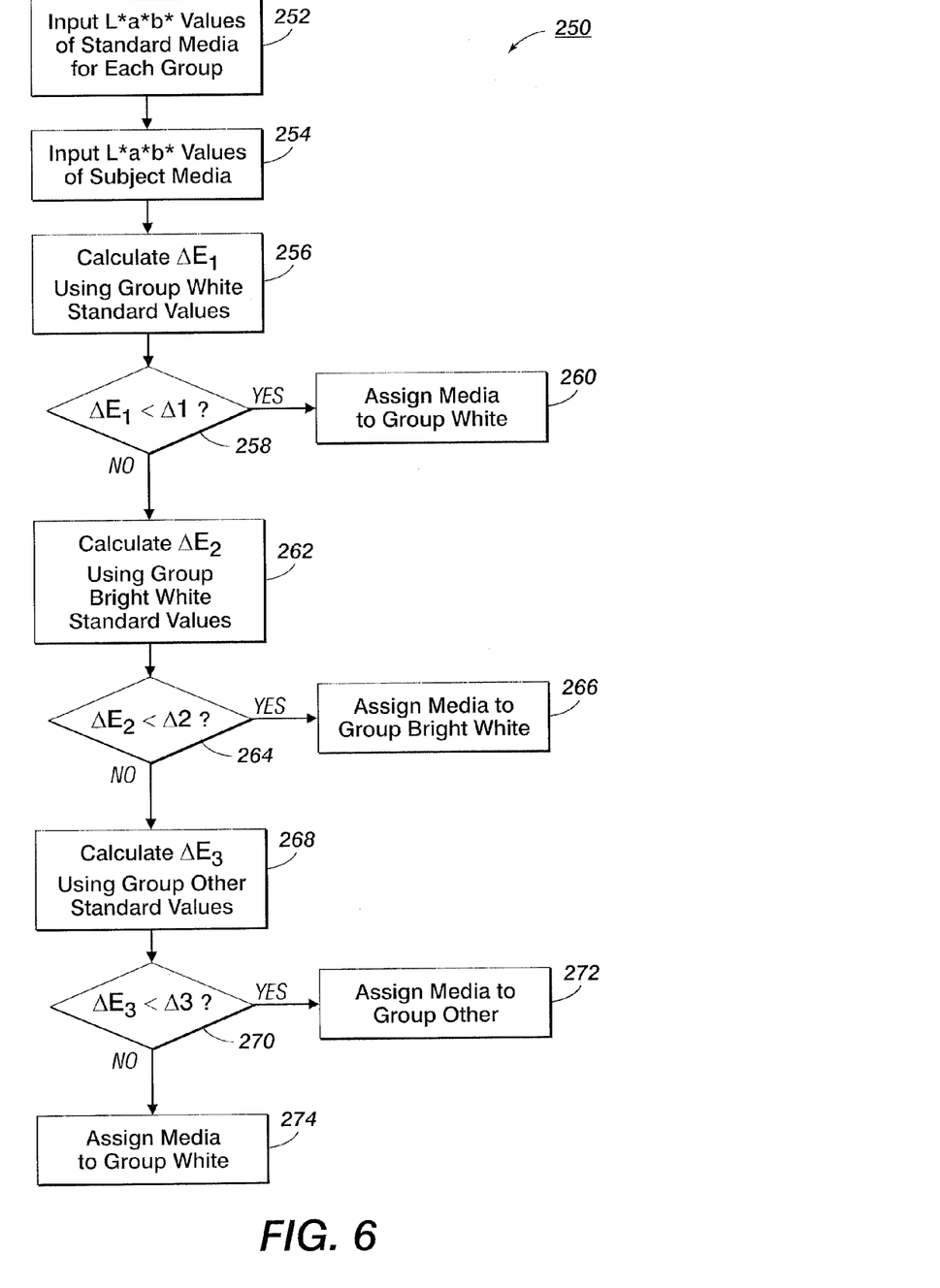
FIG. 6 is a flowchart depicting a method of grouping media based upon its whiteness.

As is shown in FIG. 6, in order to assign each type of media to one of the three groups, a process is used, shown in flowchart 250, in which Lab values of standard media for each group are input at 252. Lab values of the subject media are input at 254. An algorithm is applied which will loop through the three groupings, starting with Group White and ending with Group Other, until it finds the best match or closest reference point. The algorithm is applied at 256 to get a total color difference $\Delta E$ between the reference Group White media and the sample. This algorithm, as stated by Hunter Associates Laboratory, Reston, Va., provides that $\Delta E$ equals the square root of $(\Delta L)^2 + (\Delta a)^2 + (\Delta b)^2$ where $\Delta L = L_{sample} - L_{standard}$, $\Delta a = a_{sample} - a_{standard}$, and $\Delta b = b_{sample} - b_{standard}$.

Starting with the standard (reference) values for Group White, if $\Delta E_1$ is less than $\Delta 1$ at 258, which in the example provided above is assigned a value of 1, the media is assigned to Group White at 260. If, on the other hand, $\Delta E_1$ is greater than or equal to 1 at 262, the algorithm is applied a second time at 264 using the standard numbers for Group Bright White. If $\Delta E_2$ is less than $\Delta 2$ at 264, which in this case is 1.3, then the media is assigned to Group Bright White at 266. If $\Delta E_2$ is greater than or equal to 1.3 at 264, the algorithm is applied a third time at 268 using the standard numbers for Group Other. In this third loop, if $\Delta E_3$ is less than $\Delta 3$ at 270, which in this case is 1.85, the media is assigned to Group Other at 272. If $\Delta E_3$ is greater than or equal to $\Delta 3$ (1.85) at 270, then the media is assigned to a default group at 274, which preferably but not necessarily is Group White. Group assignments can be made at the time of media selection, in which case the data records extracted in the process shown in FIG. 4 are values of L, a and b for the selected media. As another alternative, group assignments, e.g. Group White, Group Bright White, or Group Other, can be input into the database, in which case the data records extracted in the process shown in FIG. 4 constitute a group assignment. It is noted that two, three, four or more different groups can be used.

The embodiments can be used in conjunction with a variety of different DFEs. While the process of categorizing media into group base on whiteness, as is depicted in the flowchart of FIG. 6, preferably is used in connection with xerographic printing, the process also can be used in conjunction with other types of printing, including but not limited to ink jet printing, in order to accurately represent colored images when printing documents. While the systems and methods disclosed herein are particularly useful in printing using dry toners, they also can be used in other systems, including but not limited to systems employing hybrid scavangeless development.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of controlling printer output quality comprising:

identifying media in at least one media tray, querying a media database for a record corresponding to the identified media, extracting data comprising subsystem attributes that vary with media whiteness from the record of identified media, adjusting printer operation based upon the extracted data, and printing on the identified media, wherein the printer operation is adjusted on a page-by-page basis within a single print job.

2. The method of claim 1, wherein the subsystem attributes include at least one of transfer voltage and toner deposition volume.

3. The method of claim 1, wherein the extracted data can be revised by an operator before printing operation is adjusted.

4. The method of claim 1, further comprising identifying types of print operation adjustments to be made before querying the database, and subsequently querying the database to extract data pertaining to the identified types of print operation adjustments.

5. The method of claim 1, wherein the subsystem attributes include transfer voltages.

6. A printer having adjustable quality output, the printer comprising:

a media tray, and a computer with a database, an input device for the database, and a printer operating system which includes an image quality adjuster configured to adjust at least one subsystem attribute that varies with media whiteness, wherein an operator identifies media in the media tray through the input device, and the computer queries the database for records associated with the identified media, extracts data relating to the subsystem attribute, applies the data to the image quality adjuster of the printer operating system and initiates printing.

7. The printer of claim 6, wherein the image quality adjuster adjusts at least one of transfer voltage and toner deposition volume on a page-by-page basis.

8. The printer of claim 6, wherein the extracted data is processed to assign the media to one of several groups.

9. The printer of claim 8, wherein the media is assigned to a color group.

10. A printing apparatus, comprising:
printer hardware,
at least one media tray,
a control system operative of the printer hardware, the control system including an attribute configuration subsystem which can adjust at least one of transfer voltage and toner deposition volume on a page-by-page basis within a single print job, and
a media identification database configured to receive data descriptive of the media in the at least one media tray,
wherein the control system adjusts at least one of transfer voltage and toner deposition volume based on media type, and the media identification database includes data describing at least one of media whiteness and recommended transfer voltages.

11. A method comprising:
identifying media in at least one media tray,
identifying at least one type of print operation adjustment to be made for at least one subsystem attribute that varies based upon the whiteness of the identified media,
querying a media database for a record pertaining to the type of print operation adjustment to be made,
extracting data from the record of identified media,
adjusting printer operation based upon the extracted data, and
printing on the identified media,
wherein the extracted data can be revised by an operator before printing is adjusted.

12. The method of claim 11, wherein the extracted data includes whiteness data.

13. The method of claim 11, wherein the extracted data is used to assign the identified media to a media group.

14. The method of claim 12, wherein the whiteness data is used to assign the media to a whiteness group.

15. The method of claim 12, wherein the whiteness data is used to modify a volume of toner deposition during development.

16. The method of claim 11, wherein the printer operation is adjusted on a page-by-page basis within a single print job.

* * * * *